United States Patent
Goudy et al.

(10) Patent No.: US 9,485,247 B2
(45) Date of Patent: Nov. 1, 2016

(54) ON-BOARD VEHICLE COMMUNICATION SYSTEM AND METHOD

(71) Applicant: Nissan North America, Inc., Franklin, TN (US)

(72) Inventors: Roy W Goudy, Farmington Hills, MI (US); Andrew Christensen, Livonia, MI (US); Neal Probert, Farmington Hills, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 66 days.

(21) Appl. No.: 14/197,132

(22) Filed: Mar. 4, 2014

(65) Prior Publication Data

US 2015/0256534 A1 Sep. 10, 2015

(51) Int. Cl.
*H04L 29/06* (2006.01)

(52) U.S. Cl.
CPC ......... *H04L 63/0823* (2013.01); *H04L 63/068* (2013.01); *H04L 2209/84* (2013.01)

(58) Field of Classification Search
None
See application file for complete search history.

(56) References Cited

U.S. PATENT DOCUMENTS

| | | |
|---|---|---|
| 4,352,088 A | 9/1982 | Tsunoda |
| 4,644,327 A | 2/1987 | Patterson |
| 4,706,072 A | 11/1987 | Ikeyama |
| 5,788,336 A | 8/1998 | Trovato et al. |
| 5,845,250 A | 12/1998 | Vogten |
| 5,939,976 A | 8/1999 | Sasaki et al. |
| 5,940,010 A | 8/1999 | Sasaki et al. |
| 5,979,586 A | 11/1999 | Farmer et al. |
| 6,008,741 A | 12/1999 | Shinagawa et al. |
| 6,366,207 B1 | 4/2002 | Murphy |
| 6,615,137 B2 | 9/2003 | Lutter et al. |
| 6,700,504 B1 | 3/2004 | Aslandogan et al. |
| 6,720,898 B1 | 4/2004 | Ostrem |
| 6,791,471 B2 | 9/2004 | Wehner et al. |

(Continued)

FOREIGN PATENT DOCUMENTS

| | | |
|---|---|---|
| EP | 1962255 A1 | 8/2008 |
| JP | S59-102634 A | 6/1984 |

(Continued)

OTHER PUBLICATIONS

Kurt, Arda et al., "Hybrid-state driver/vehicle modelling, estimation and prediction", 13th International IEEE Annual Conference on Intelligent Transportation Systems, Madeira Island, Portugal, Paper TA3.4, Sep. 19-22, 2010, pp. 806-811.

(Continued)

*Primary Examiner* — Farid Homayounmehr
*Assistant Examiner* — Thanh T Le
(74) *Attorney, Agent, or Firm* — Global IP Counselors, LLP (57) ABSTRACT

An on-board vehicle communication system and method employ a storage device, a communication device and a controller. The storage device is configured to store a plurality of security certificates. The communication device is configured to receive external information that is external to a host vehicle equipped with the on-board vehicle communication system. The controller is configured to determine whether to begin a security certificate replenishment process to attempt to receive additional security certificates from at least one source that is external of the host vehicle based on the received external information, upon an amount of security certificates stored in the storage device decreasing below a first prescribed threshold.

20 Claims, 6 Drawing Sheets

(56) References Cited

U.S. PATENT DOCUMENTS

| | | | |
|---|---|---|---|
| 6,810,328 | B2 | 10/2004 | Yokota et al. |
| 7,274,288 | B2 | 9/2007 | Nagata |
| 8,000,897 | B2 | 8/2011 | Breed et al. |
| 8,175,796 | B1 | 5/2012 | Blackburn et al. |
| 8,340,894 | B2 | 12/2012 | Yester |
| 8,466,807 | B2 | 6/2013 | Mudalige |
| 8,548,729 | B2 | 10/2013 | Mizuguchi |
| 8,577,550 | B2 | 11/2013 | Lu et al. |
| 8,587,418 | B2 | 11/2013 | Mochizuki et al. |
| 8,639,426 | B2 | 1/2014 | Dedes et al. |
| 8,717,192 | B2 | 5/2014 | Durekovic et al. |
| 9,026,354 | B1* | 5/2015 | Persson .................. G01C 21/26 701/400 |
| 2004/0078563 | A1* | 4/2004 | Kimes ................ G07C 9/00103 713/155 |
| 2006/0142917 | A1* | 6/2006 | Goudy .................. B60K 35/00 701/45 |
| 2007/0083296 | A1* | 4/2007 | Tengler ............ G08G 1/096716 701/1 |
| 2008/0085687 | A1* | 4/2008 | Brekke ................. H04M 1/663 455/187.1 |
| 2009/0033540 | A1 | 2/2009 | Breed et al. |
| 2009/0140887 | A1 | 6/2009 | Breed et al. |
| 2009/0198412 | A1 | 8/2009 | Shiraki |
| 2010/0169009 | A1 | 7/2010 | Breed et al. |
| 2010/0290292 | A1* | 11/2010 | Tanizaki ................ G11C 16/10 365/185.22 |
| 2012/0016581 | A1 | 1/2012 | Mochizuki et al. |
| 2012/0041633 | A1* | 2/2012 | Schunder ............... B60K 35/00 701/29.2 |
| 2012/0218093 | A1 | 8/2012 | Yoshizawa et al. |
| 2013/0116915 | A1 | 5/2013 | Ferreira et al. |
| 2013/0179047 | A1 | 7/2013 | Miller et al. |
| 2013/0278440 | A1 | 10/2013 | Rubin et al. |
| 2015/0005981 | A1* | 1/2015 | Grimm .................. G07C 5/008 701/1 |
| 2015/0179071 | A1* | 6/2015 | Canac .................... G08G 1/163 701/301 |

FOREIGN PATENT DOCUMENTS

| | | |
|---|---|---|
| JP | S61-253238 A | 11/1986 |
| JP | 2000-127796 A | 5/2000 |
| JP | 2001-118199 A | 4/2001 |
| JP | 2003-51099 A | 2/2003 |
| WO | 03091966 A1 | 11/2003 |

OTHER PUBLICATIONS

Kurt, Arda (dissertation), "Hybrid-state system modelling for control, estimation and prediction in vehicular autonomy", presented in Partial Fulfillment of the Requirements for the Degree Doctor of Philosophy in the Graduate School of The Ohio State University, Mar. 2012, UMI/Proquest Pub. No. 3497707, 136 pages (total).

John Jacob Winters, An Investigation of Auditory Icons and Brake Response Times in a Commercial Truck-Cab Environment (Virginia Polytechnic Institute and State Univ. 1998).

Driver Focus-Telematics Working Group, Statement of Principles, Criteria and Verification Procedures on Driver Interactions with Advanced In-vehicle Information and Communication Systems (Version 2.0, 2002).

John L. Campbell et al., Comprehension Testing of Active Safety Symbols (SAE International 2004).

Pontus Larsson et al., Emotional and Behavioral Response to Auditory Icons and Earcons in Driver-vehicle Interfaces (Sweden, Paper No. 09-0104).

M.L. Cummings et al., Effects of Single versus Multiple Warnings on Driver Performance (Human Factors and Ergonomics Society 2011).

Michael A. Nees & Bruce N. Walker, Auditory Displays for In-vehicle Technologies (Human Factors and Ergonomics Society 2011).

Kathleen A. Harder, John Bloomfield, and Benjamin J. Chibak, The Effectiveness of Auditory Side- and Forward-Collision Avoidance Warnings in Winter Driving Conditions (Minnesota Department of Transportation, Report No. MN/RC 2003-14,2003).

\* cited by examiner

ON-BOARD VEHICLE COMMUNICATION SYSTEM AND METHOD

BACKGROUND OF THE INVENTION

1. Field of the Invention

The present invention generally relates to an on-board vehicle communication system and method. More specifically, the present invention relates to an on-board vehicle communication system and method for determining a time and manner in which to perform a security certificate replenishment process on a vehicle based on the vehicle's driving environment.

2. Background Information

Vehicles are becoming equipped with more sophisticated communication devices and are thus becoming increasingly connected to surrounding communication infrastructure as well as to other vehicles. Such types of communication access points that vehicles use to communicate with the infrastructure and other vehicles include cellular communication, direct satellite communication and methods that incorporate the IEEE 802.11 family of wireless communication standards such as WiFi and Dedicated Short Range Communication (DSRC), to name a few. It is also often necessary or desirable to sign the communications with security certificates so that the communications can be more readily trusted by the recipients. Naturally, these security certificates become depleted and need to be replenished periodically.

SUMMARY OF THE INVENTION

As can be appreciated from the above, a need exists for an improved system and method for replenishing security certificates used for communication by the vehicle on-board vehicle communication system.

In accordance with one aspect of the present invention, an on-board vehicle communication system and method are provided which employ a storage device, a communication device and a controller. The storage device is configured to store a plurality of security certificates. The communication device is configured to receive external information that is external to a host vehicle equipped with the on-board vehicle communication system. The controller is configured to determine whether to begin a security certificate replenishment process to attempt to receive additional security certificates from at least one source that is external of the host vehicle based on the received external information, upon an amount of security certificates stored in the storage device decreasing below a first prescribed threshold.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
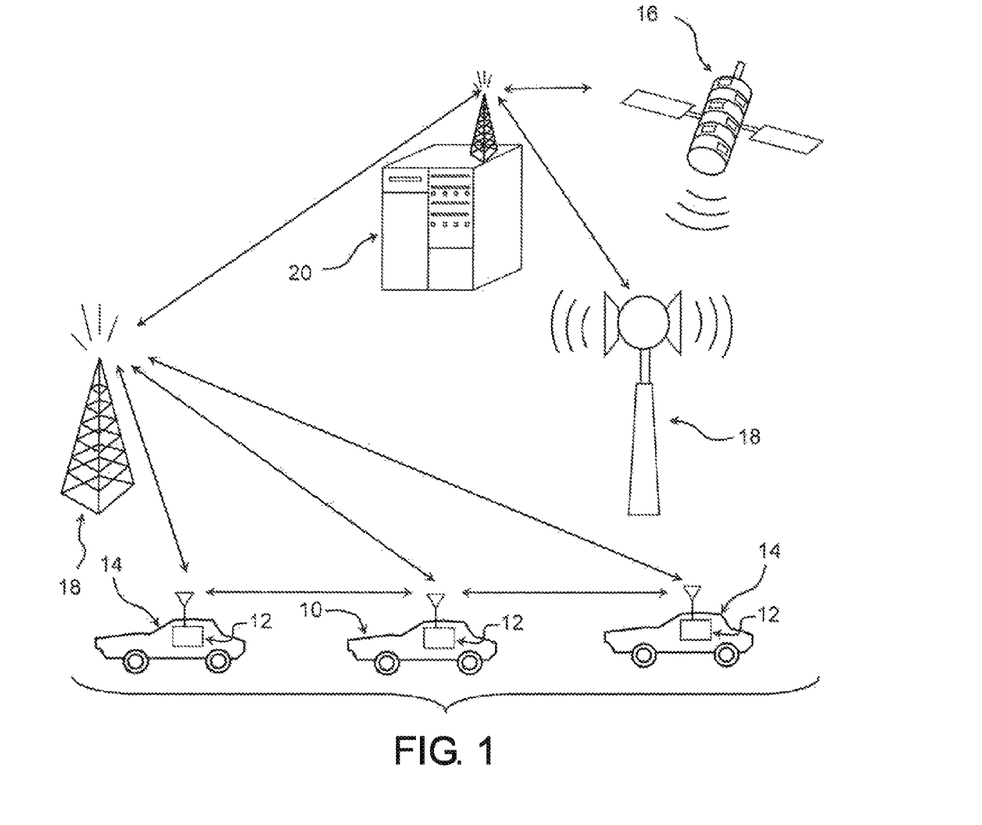
FIG. 1 is a block diagram illustrating an example of a host vehicle equipped with an on-board vehicle communication system according to embodiments disclosed herein in relation to remote vehicles and components of a wireless communication network.

FIG. 1 is a block diagram illustrating a host vehicle (HV) 10 that is equipped with an on-board vehicle communication system 12 according to a disclosed embodiment that can perform vehicle-to-vehicle communication, vehicle-to-infrastructure communication, or both. As discussed herein, the host vehicle 10 can also be referred to as a subject vehicle (SV). The on-board vehicle communication system 12 communicates with at least one remote vehicle (RV) 14 that can also include an on-board vehicle communication system 12. Alternatively, the remote vehicle 14 can include another type of two-way communication system, such as an adaptive cruise control system, that is capable of communicating information about at least the location and speed of the remote vehicle 14 as understood in the art. A remote vehicle 14 can also be referred to as a target vehicle (TV) or a threat vehicle (TV).

The on-board vehicle communication system 12 of the host vehicle 10 and the remote vehicle 14 communicates with the two-way wireless communications network. As seen in FIG. 1, for example, the two-way wireless communications network can include one or more global positioning satellites 16 (only one shown), and one or more terrestrial units, such as roadside (terrestrial) units 18 (two are shown), and a base station or external server 20. The global positioning satellites 16 and the roadside units 18 send and receive signals to and from the on-board vehicle communication system 12 of the host vehicle 10 and the remote vehicles 14. The base station 20 sends and receives signals to and from the on-board vehicle communication system 12 of the host vehicle 10 and the remote vehicles 14 via a network of the roadside units 18, or any other suitable two-way wireless communications network.

Figure 2:
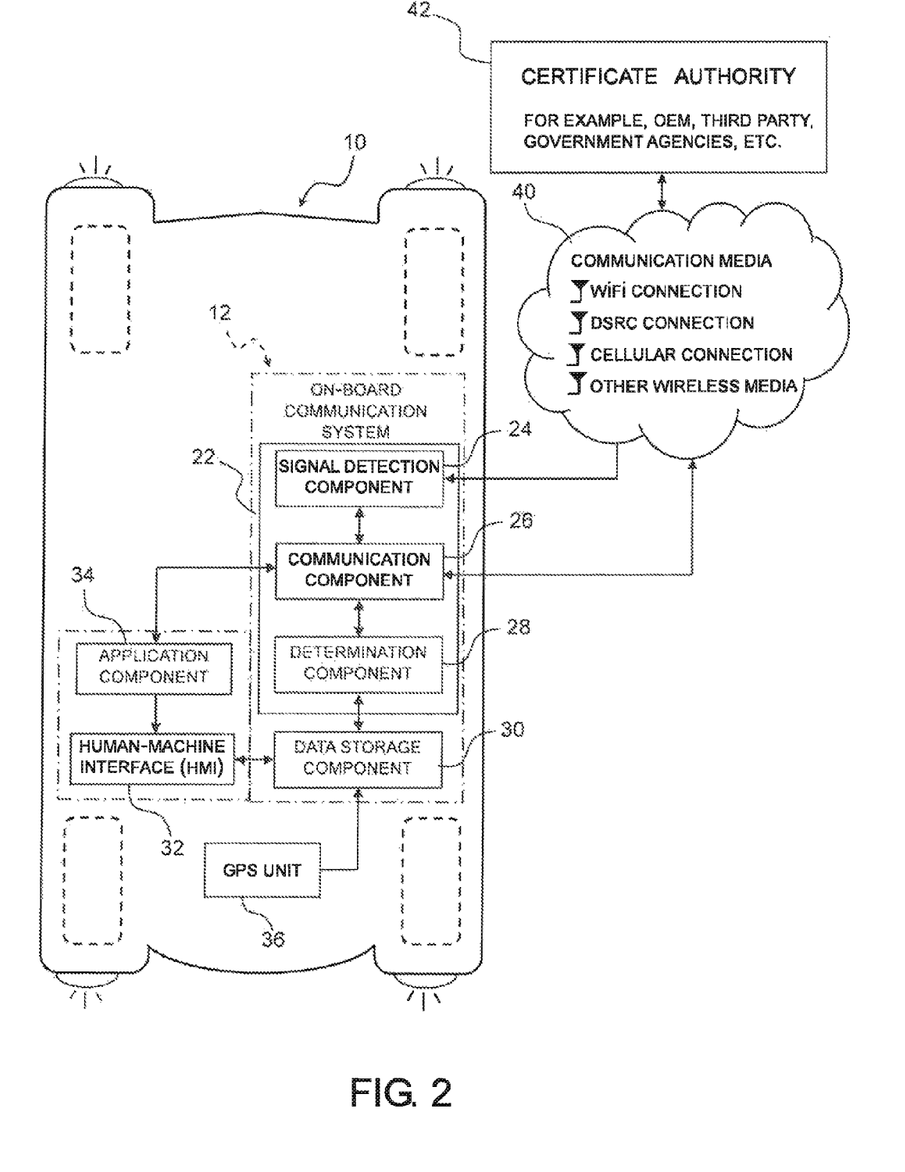
FIG. 2 is a block diagram of exemplary components of the host vehicle equipped with an on-board vehicle communication system according to embodiments disclosed herein.
Figure 3:
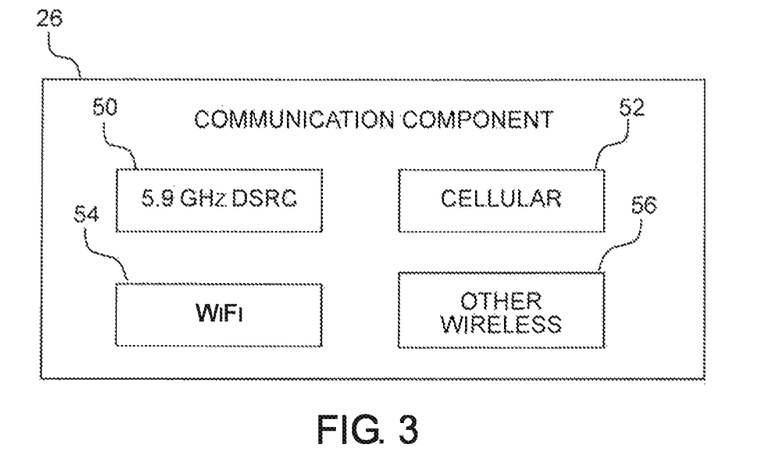
FIG. 3 is a block diagram of exemplary components of a communication component of the on-board vehicle communication system according to embodiments disclosed herein.

As shown in more detail in FIGS. 2 and 3, the on-board vehicle communication system 12 includes an application controller 22 that can be referred to simply as a controller 22. The controller 22 preferably includes a microcomputer with a control program that controls the components of the on-board vehicle communication system 12 as discussed below. The controller 22 includes other conventional components such as an input interface circuit, an output interface circuit, and storage devices such as a ROM (Read Only Memory) device and a RAM (Random Access Memory) device. The microcomputer of the controller 22 is at least programmed to control the on-board vehicle communication system 12 in accordance with the flow chart of FIGS. 6 and 7 discussed below. It will be apparent to those skilled in the art from this disclosure that the precise structure and algorithms for the controller 22 can be any combination of hardware and software that will carry out the functions of the present invention. Furthermore, the controller 22 can communicate with the other components of the on-board vehicle communication system 12 discussed herein via, for example a controller area network (CAN) bus or in any other suitable manner as understood in the art.

As shown in more detail in FIG. 2, the host vehicle 10 on which the on-board vehicle communication system 12 is disposed can further include, for example, a signal detection component 24, a communication component 26, a determination component 28 and a data storage and retrieval component 30. The host vehicle 12 further includes a human-machine interface (HMI) 32 which may be an integral part of the on-board vehicle communication system 12 or independently installed on the host vehicle 10. A user (e.g., the driver and/or passenger) can interact with the on-board vehicle communication system 12 via the HMI 32. For example, as understood in the art, the user can use the HMI 32 to perform such tasks as register cell phone numbers, Internet hostnames or IP addresses on a priority list that can be stored in the data storage component 30. The user can also use the HMI 32 to input other information such as the priority level of a particular IP address or phone number as discussed herein. This information along, with other information such as vehicle performance data, vehicle location data and so on can be stored in the data storage component 30.

The data storage component 30 can also store security certificates which are used for communication as understood in the art. As discussed in more detail below, the on-board vehicle communication system 12 communicates via communication access points 40 (e.g., different types of communication media) with one or more certificate authorities 42 that resides external to the host vehicle 10 and generates security certificates as understood in the art. The communication access point 40 is supported by the two-way wireless communications network and can include WiFi connections, dedicated short range communication (DSRC) connections, cellular connections and other wireless media as understood in the art. The on-board vehicle communication system 12 can also use communication channels defined for battery, fuel cell or hybrid electric vehicles (BEV/FCV/HEVs) charging and smart grid communications. The certificate authority 42 responds to a request for security certificates made by the on-board vehicle communication system 12 over one or more communication access points 40 that is selected by the on-board vehicle communication system 12 as discussed herein and provides the security certificates over the selected communication access point 40.

The on-board vehicle communication system 12 also interacts with one or more application components 34 that may be integral parts of the on-board vehicle communication system 12, may be independently installed on the host vehicle 10, or both. An application component 34 may include, for example, a warning system that uses data received by the on-board vehicle communication system 12 from the remote vehicles 14, roadside units 18, or any other device to advise or warn the user (e.g., the driver) of the host vehicle 10 of potential situations, such as possible contact with an external object or remote vehicle 14, weather or traffic conditions, and so on. The on-board vehicle communication system 12 can also communicate with a GPS unit 36 that can receive GPS information from, for example, the satellites 16 or any other suitable devices. As understood in the art, the GPS information can indicate the location of the host vehicle 10 and other locations of interest as discussed herein.

As shown in more detail in FIG. 3, the communication component 26 includes, for example, a DSRC component 50, a cellular component 52, a WiFi component 54 and other wireless media components 56 that can communicate via the DSRC connections, WiFi connections, cellular connections and other wireless media of the communication access point 40 as understood in the art. For example, the controller 22 can control the signal detection component 24 to search the wireless communications network for available communication access point 40. As understood in the art, the signal detection component 24 can employ any suitable signal selection protocol to choose the appropriate one or more of the available communication access point 40. The signal detection component 24 can also determine when to switch from one communication access point 40 to another if, for example, the originally selected communication medium becomes unavailable. Furthermore, the signal detection component 24 can monitor for a cell phone signal within the passenger compartment of the host vehicle 10. If a cell phone signal is detected, the signal detection component 24 can provide information pertaining to the cell phone (e.g., telephone number, etc.) to, for example, the determination component 28 and the data storage component 30 for reference and use as described herein.

The controller 22, for example, the signal detection component 24, then can configure the communication component 26 to communicate via the selected communication access point 40. Thus, the communication component 26 receives information from available communication access point 40, and provides this information to the determination component 28, the data storage component 30, the HMI 32, the application components 34 and any other components on the host vehicle 10. The communication component 26 also transmits information to remote vehicles 14, the certificate authority 42 and any other remote destinations over the two-way wireless communications network, as shown in FIG. 1, using the available communication access point 40. Naturally, the communication component 26 can use different types of communication access point 40 for incoming and outgoing communications.

Figure 4:
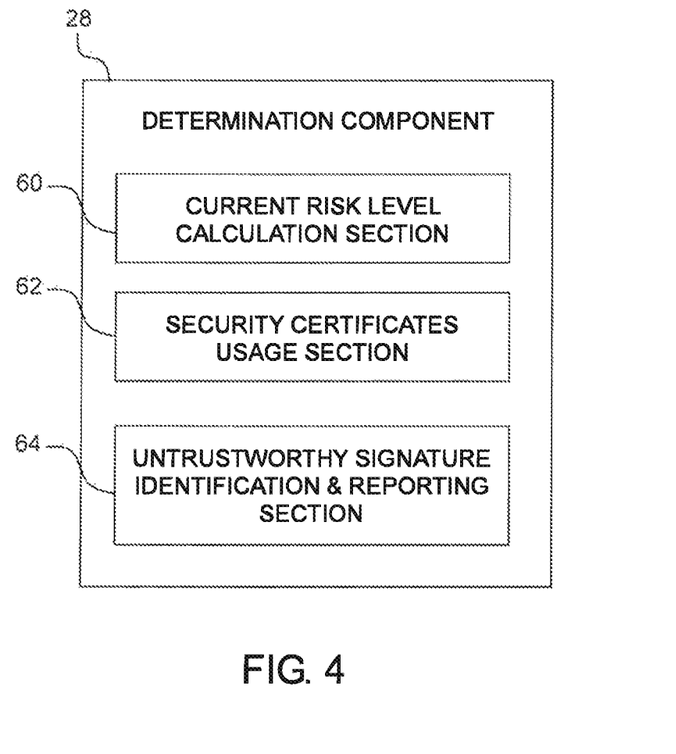
FIG. 4 is a block diagram of exemplary components of a determination component of the on-board vehicle communication system according to embodiments disclosed herein.
Figure 5:
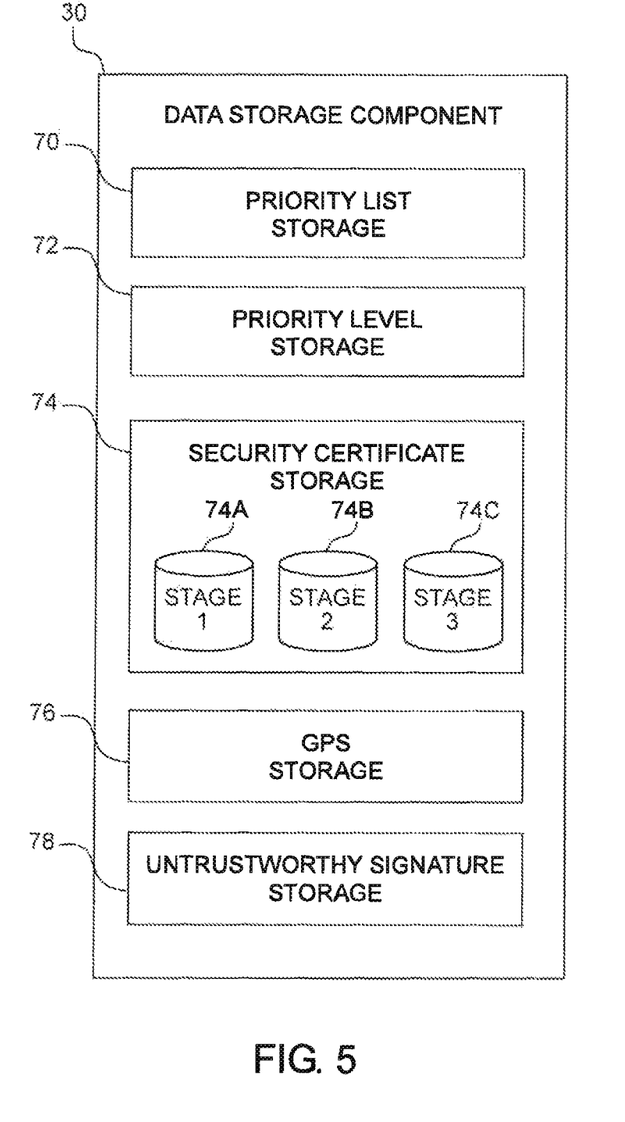
FIG. 5 is a block diagram of exemplary components of a data storage component of the on-board vehicle communication system according to embodiments disclosed herein.

As shown in FIG. 4, the determination component 28 can include a current risk level calculation section 60, a security certificates usage section 62, and an untrustworthy signature identification and reporting section 64 as discussed in more detail below. Furthermore, as shown in FIG. 5, the data storage component 30 can include a priority list storage 70, a priority level storage 72, a certificate storage 74 including a multi-staged storage configuration (e.g., stage 1 storage section 74A, stage 2 storage section 74B and stage 3 storage section 74C), a OPS storage 76 and an untrustworthy signature storage 78 as discussed in more detail below.

An example of operations performed by the on-board vehicle communication system 12 will now be described in more detail with regard to the further aspects of the determination component 28 and the data storage component 30 shown in FIGS. 4 and 5, and the flowcharts shown in FIGS. 6 and 7. The processing shown in FIGS. 6 and 7 can be performed by, for example, the determination component 28 of the controller 22 or by any other suitable component.

Figure 6:
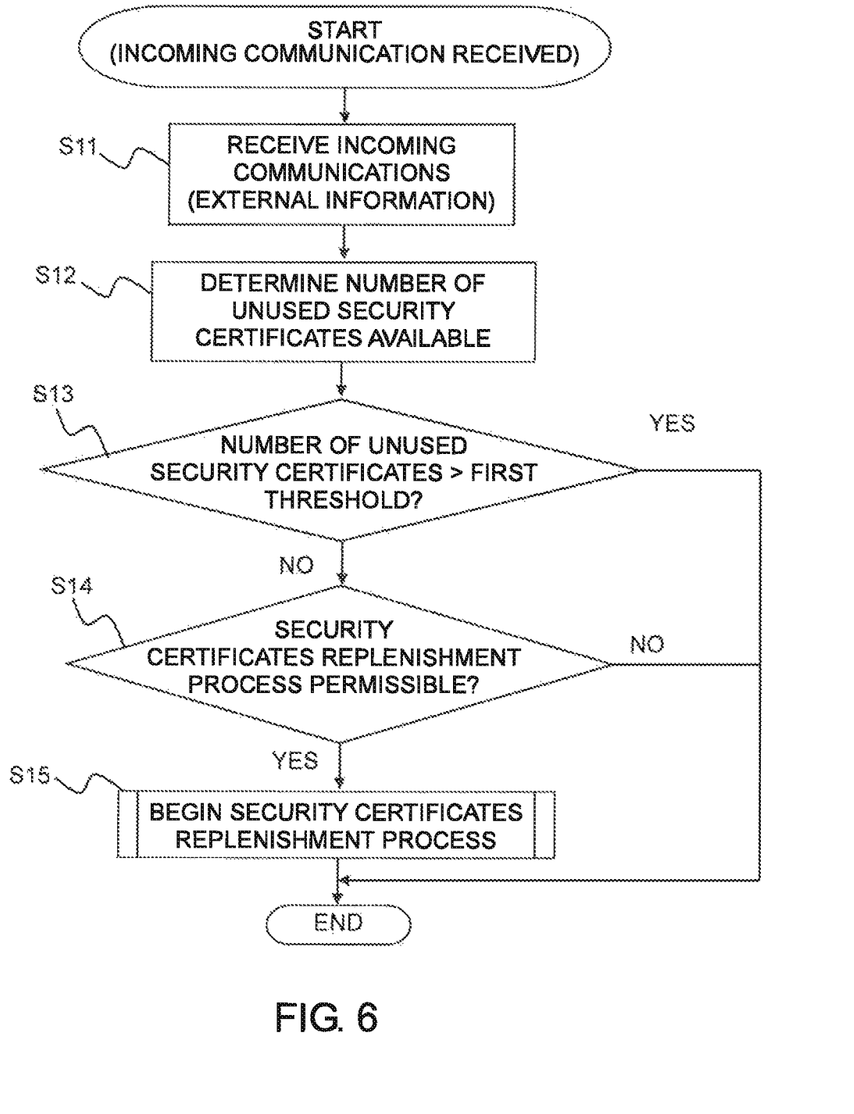
FIGS. 6 and 7 are flowcharts illustrating examples of operations performed by the on-board vehicle communication system according to embodiments disclosed herein.

As shown in FIG. 6, when the communication component 26 receives incoming communications via the two-way wireless communications network from, for example, remote vehicles 14, the terrestrial or roadside units 18 and so on, in step S11, the processing can prepare to perform outgoing communication. As understood in the art, the on-board vehicle communication system 12 can use security certificates to sign messages that are being broadcast to external recipients, such as remote vehicles 12, terrestrial or roadside units 18 and other destinations in the two-way wireless communication network. As part of the communication process, the on-board vehicle communication system 12 can monitor the supply of unused security certificates that are stored in the data storage component 30 in step S12. For instance, the security certificates usage section 62 of the determination component 28 can monitor the supply of unused security certificates stored in the security certificate storage 74.

If the processing determines in step S13 that the number of unused security certificates is greater than a threshold (e.g., a first threshold), the processing determines that there are a sufficient number of unused security certificates available for use in the outgoing communications. Therefore, the processing ends and the on-board vehicle communication system 12 can perform the outgoing communication. However, if the processing determines in step S13 that the number of unused security certificates is not greater than the threshold, the processing continues to determine whether a security certificate replenishment process is permissible step S14, based on a current risk level.

The current risk level calculation section 60 can evaluate information received by the communication component 26 from surrounding remote vehicles 14, the roadside units 18 and any other devices in the two-way wireless communication network to calculate and store a current risk level for the driving environment in which the host vehicle 10 is present.

For example, if the communication component 26 is receiving information from many remote vehicles 14, the current risk level calculation section 60 can determine that the host vehicle 10 is driving in a very congested driving environment. In this event, the current risk level calculation section 60 can determine that it is necessary to continue to efficiently receive the information from the remote vehicle 14 and other devices in the driving environment so that the controller 22 has access to that information to perform, for example, contact avoidance operations and so on. Therefore, the current risk level calculation section 60 can set the current risk level to be high. Upon determining that the current risk level is high, the controller 22 can operate to refrain from requesting security certificates at that time, or can also suppress certain incoming calls or messages as discussed below.

However, if the communication component 26 is receiving information from only a few remote vehicles 14, the current risk level calculation section 60 can determine that the host vehicle 10 is driving in a driving environment with little congestion. Therefore, the current risk level calculation section 60 can set the current risk level to be low or at least at a level that is lower than the high risk level. Upon determining that the current risk level is low, the controller 22 can determine that this may be an opportune time for the on-board vehicle communication system 12 to attempt to replenish the supply of security certificates as discussed below. The controller 22 can also permit incoming calls or messages to be received as discussed below.

Thus, as can be appreciated from the above, the controller 22 determines a risk factor based on the received external information and determines based on the risk factor whether to begin the security certificate replenishment process. The controller 22 compares the risk factor to a risk threshold to determine whether to begin the security certificate replenishment process. The controller 22 proceeds to perform the security certificate replenishment process of step S15 upon determining that the risk factor is below the risk threshold.

Figure 7:
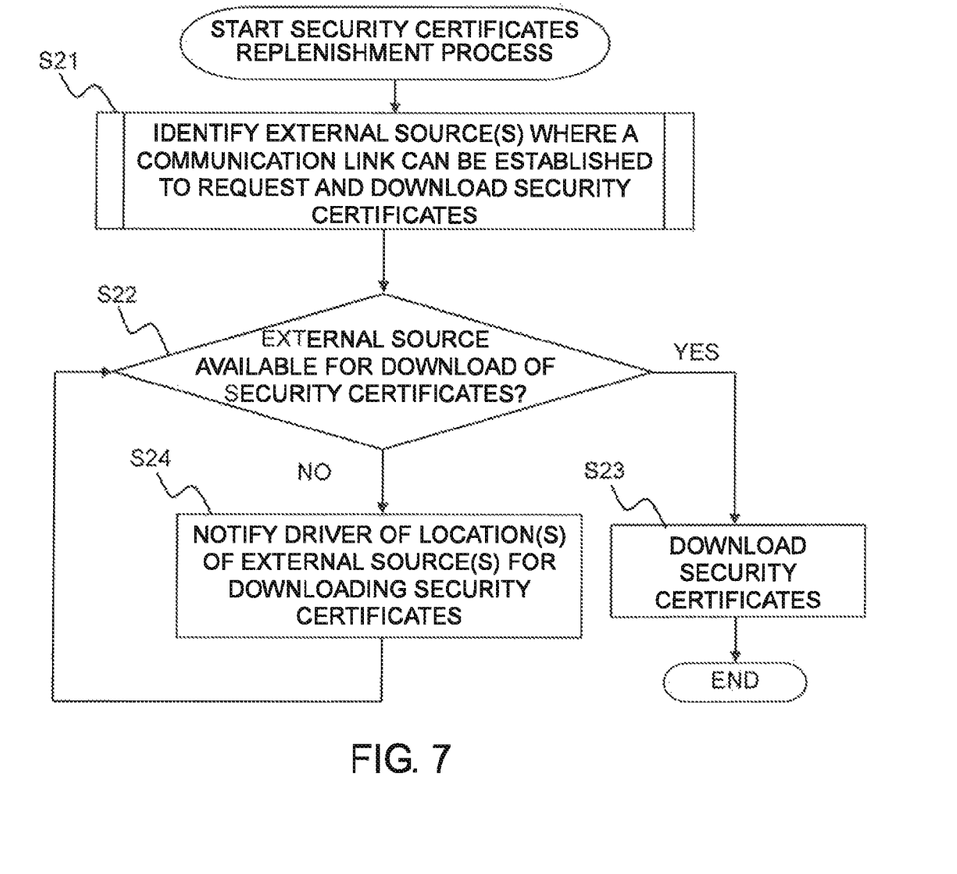

The security certificate replenishment process of step S15 can be demonstrated, for example, in the flowchart of FIG. 7. Thus, upon an amount of security certificates stored in the data storage component 30 (e.g., a storage device) decreasing below a first prescribed threshold, the controller 22 determines whether to begin a security certificate replenishment process to attempt to receive additional security certificates from at least one security certificate authority that is external of the host vehicle 10 based on the received external information. When beginning the process, the determination component 28 can control the HMI 32 to provide a notification or warning (e.g., a visual, audio and/or tactile warning) that the level of security certificates is becoming low and that an attempt to replenish the security certificates is being made.

In step S21 of the process shown in FIG. 7, the on-board vehicle communication system 12 can identify external sources (e.g., communication access points 40) from which security certificates can be downloaded. The term "source" or "sources" can thus be used herein to describe a communication access point or points 40 having the configurations and functionality described herein, and thus can also refer to the connection between the on-board vehicle communication system 12 and a certificate authority 42 via a communication media such as a communication access point 40.

The processing then determines in step S22 whether any such sources are available. If any sources (e.g., communication access points 40) are available, the processing can continue to step S23 and automatically download the security certificates via the communication access point 40 that can be selected as discussed above. That is, the communication component 26 can send a request to the available certificate authority 42 via the selected communication access point 40. The communication access point 40 thus receives the security certificates from the certificate authority via the selected communication access point 40. The controller 22 (e.g., the determination component 28) can store the security certificates in the stages 74A through 74C of the security certificate storage 74. Furthermore, if multiple communication access points 40 are available, the determination component 28 can control the HMI 32 to provide a notification (e.g., visual, audio and/or tactile) to the user which permits the user to connect to a desired communication access point 40 to use to replenish security certificates based on, for example, a desired certificate authority 42 or type of communication access point 40 (e.g., DSRC, WiFi, cellular, etc.). The user may select the desired communication access point 40 based on characteristics of the communication access point 40, such as the security level of the communication access point 40 (e.g., secure DSRC, secure WiFi, etc.). The determination component 28 can also automatically connect to the communication access point 40 to use based on predetermined characteristics (e.g., DSRC, WiFi, cellular, the security of the connection, etc.) and so on. For instance, the characteristics can include information pertaining to the communication type having a communication security level higher than any other of communication type. Accordingly, a plurality of communication access points 40, such as 5.9 GHz DSRC, WiFi, cellular networks, satellite communications and so on, can be exploited automatically without any action by the user, and thus maximum flexibility can be achieved.

It should also be noted that the controller 22 can store the security certificates in the stages 74A through 74C in a particular manner, and retrieve the security certificates from stages 74A through 74C in a particular manner. For example, when the security certificate usage section 62 retrieves security certificates from the security certificate storage 74, the security certificate usage section 62 can first retrieve the security certificates from stage 74A. As the security certificates are retrieved from stage 74A, stage 74B can transfer more stored security certificates into stage 74A. Likewise, as these security certificates are being transferred from stage 74B to stage 74A, stage 74C can transfer more stored security certificates into stage 74B. The threshold used in step S13 (first threshold) can be set to any suitable level. For example, the first threshold can indicate when the security certificates have been depleted from stage 74C. Naturally, the controller 22 can set additional thresholds which represent that, for example, the security certificates have been depleted from stage 74B and ultimately from stage 74A (i.e., no more security certificates are remaining). In the event that all of the stored security certificates have been depleted, the on-board vehicle communication system 12 can use a single "backup" security certificate that does not change for each communication.

In addition to retrieving the security certificates from the security certificate storage 74 in a particular manner, the security certificate usage section 62 can begin storing security certificates in stage 74A. As stage 74A becomes full of security certificates, stage 74A can then begin transferring security certificates into stage 74B. As stage 74B becomes full, stage 74B can begin transferring security certificates into stage 74C until stage 74C is full. Naturally, the security certificate usage section 62 can store and retrieve security certificates to and from the stages 74A through 74C in any suitable manner, and the security certificate storage 74 can include any number of stages (e.g., one stage to any practical number of stages).

Turning back to step S22, if the processing determines that external sources (e.g., communication access points 40) for downloading security certificates are not presently available, the processing can continue to step S24 during which the determination component 28 can control the HMI 32 to provide a notification or warning (e.g. a visual, audio and/or tactile warning) to the user. The notification can indicate to the user that the security certificates are depleted and should be replenished at the earliest practical opportunity. The notification can additionally provide, in the absence of any currently available sources, information for the user to locate a source. For example, the determination component 28 can control the HMI 32 to provide a map based on information stored in the GPS storage of the data storage component 30, information received from the OPS unit 36, or both, that indicates the location of the host vehicle 10 and locations of communication access points 40 to the certificate authority or authorities 42. The map can also indicate the type of connection or connections (e.g., DSRC, WiFi, cellular, etc.) that are available at each of the communication access points 40. Therefore, the user can drive the host vehicle 10 to a location at or proximate to a desired one of the communication access points 40 to download security certificates. Furthermore, the user can use the HMI 32, for example, to select the desired type of connection to use at that communication access point 40 or the system can automatically switch to the type of connection appropriate for that communication access point 40.

In addition to the above security certificate replenishment process, the on-board vehicle communications system 12 can also use the risk level calculated by the current risk level calculation section 60 as described above to manage incoming messages. For example, as shown in FIG. 5, the data storage component 30 can store identifying information such as IP addresses, telephone numbers and so on in the priority list storage 70. The data storage component 30 can also store respective priority level information associated with the identifying information in the priority level storage 72. For instance, certain known IP addresses, telephone numbers etc. can be assigned a very high priority level, while unknown IP addresses, telephone numbers etc. can be assigned a very low priority level.

When an incoming communication is received by the communication component 26, the determination component 28 can compare identifying information (e.g., IP address, telephone number, etc.) to the information in the priority list storage 70 and the corresponding priority level information in the priority level storage 72 to assess the priority level of the incoming communication. The determination component 28 can then determine whether to allow the communication to be received by the user or suppressed. For instance, the determination component 28 can compare the priority level associated with the incoming communication to the calculated risk level. If the risk level is high, the determination component 28 can operate to suppress (e.g., send directly to voicemail or provide to an inbox without a receipt alert) all incoming communications except for those having a very high priority level (e.g., a message from a spouse, supervisor, an emergency message and so on). Thus, the determination component 28 can provide the high priority level messages to the user. However, if the risk level is low, the determination component 28 can operate to provide even lower priority incoming communications to the user.

Furthermore, as shown in FIG. 4, the untrustworthy signature identification and reporting section 64 of the determination component 28 can identify incoming communications that may be suspect or untrustworthy. That is, it is possible for the content of received messages or communications to be inaccurate or even false due to, for example, a malfunctioning system on a transmitting remote vehicle 14 or a willful attempt to transmit erroneous messages or information. For example, if information included in the incoming communication appears suspect or untrustworthy (e.g., the information indicates that a speed of a remote vehicle 14 is above a predefined threshold level, the information indicates that the remote vehicle 14 is further than a predefined threshold distance, etc.), the untrustworthy signature identification and reporting section 64 can flag that communication and the source identifying information (e.g., the IP address, the phone number, etc.) and security signature of that communication as untrustworthy. Therefore, the untrustworthy signature identification and reporting section 64 can store this untrustworthy identification information in, for example, the untrustworthy signature storage 78 located in the data storage component 30 for future reference. For instance, the determination component 28 can compare the signature or other identifying information of a received communication with the information in the untrustworthy signature storage 78 to determine whether to ignore or suppress this information. The determination component 28 can also control the communication component 26 to provide a communication to report the untrustworthy signature to an authority tasked with assessing and maintaining a record of misbehavior. Thus, the controller 22 assesses a validity of the received external information based on information included in the received external information, and controls the communication component 26 to provide an invalidity indicator for receipt by an external destination upon determining that the received external information is potentially invalid.

While only selected embodiments have been chosen to illustrate the present invention, it will be apparent to those skilled in the art from this disclosure that various changes and modifications can be made herein without departing from the scope of the invention as defined in the appended claims. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An on-board vehicle communication system comprising:
    a memory configured to store a plurality of security certificates;
    a communication processor configured to receive external information that is external to a host vehicle equipped with the on-board vehicle communication system, the external information representing a driving environment in which the host vehicle is travelling the communication device being further configured to communicate with a remote device that is external to the host vehicle; and
    a controller configured to evaluate whether an amount of security certificates stored in the storage device has decreased below a first prescribed threshold and, upon determining that the amount of security certificates has decreased below the first prescribed threshold, perform a security certificate replenishment process while permitting the communication device to use a backup security certificate, which is different from any other of the security certificates, to communicate with the remote device, such that during the security certificate replenishment process the controller evaluates the external information representing the driving environment to assess a risk factor pertaining to the travelling of the host vehicle in the driving environment, compares the risk factor to a risk threshold, controls the communication device to attempt to receive additional security certificates from at least one source that is external of the host vehicle upon determining that the risk factor is below the risk threshold, and controls the communication device to refrain from attempting to receive the additional security certificates from the at least one source upon determining that the risk factor is at least equal to the risk threshold.

2. The on-board vehicle communication system according to claim 1, wherein
    the controller is further configured to determine a traffic environment based on the received external information representing the driving environment and to determine the risk factor based on the traffic environment.

3. The on-board vehicle communication system according to claim 2, wherein
    the controller is further configured to set the risk factor at a first risk factor level upon determining that the driving environment indicates a first traffic level and to set the risk factor at a second risk factor level, which indicates less risk than that indicated by the first risk factor level, upon determining that the driving environment indicates a second traffic level which indicates an amount of traffic that is sparser than an amount of traffic indicative of the first traffic level.

4. The on-board vehicle communication system according to claim 1, wherein
    the controller is further configured to set the risk factor at a first risk factor level upon determining that the external information representing the driving environment indicates a first probability of the host vehicle contacting a remote object, and to set the risk factor at a second risk factor level, which is lower than the first risk factor level, upon determining that the external information representing the driving environment indicates a second probability of the host vehicle contacting a remote object, the second probability being lower than the first probability.

5. The on-board vehicle communication system according to claim 1, wherein
    the controller is configured to provide a security certificate replenishment notification during the security certificate replenishment process.

6. The on-board vehicle communication system according to claim 1, wherein
    the controller is configured to control the communication device to attempt to obtain additional security certificates from the source during the security certificate replenishment process.

7. The on-board vehicle communication system according to claim 1, wherein
    the memory is configured to store a plurality of security certificates in a plurality of storage stages.

8. The on-board vehicle communication system according to claim 7, wherein
    the plurality of storage stages includes a first storage stage and a second storage stage, and the controller is configured to move those of the security certificates in the second storage stage to the first storage stage as the security certificates in the first storage stage are depleted.

9. The on-board vehicle communication system according to claim 1, wherein
    the controller is configured to control a user interface in the host vehicle to present information pertaining to at least one characteristic of the at least one source.

10. The on-board vehicle communication system according to claim 9, wherein
    the at least one characteristic includes information pertaining to at least one location of the at least one source in relation to a present location of the host vehicle.

11. The on-board vehicle communication system according to claim 10, wherein
    the at least one characteristic includes information pertaining to the source that is closest to the present location of the host vehicle.

12. The on-board vehicle communication system according to claim 9, wherein the at least one characteristic includes information pertaining to at least one type of connection of the at least one source.

13. The on-board vehicle communication system according to claim 12, wherein
the at least one characteristic includes information pertaining to the type of connection having a security level which is more secure than a respective security level of any other type of connections available at the at least one source.

14. The on-board vehicle communication system according to claim 1, wherein
the memory is configured to store a plurality of external source identifiers and a respective priority level associated with each respective one of the external source identifiers; and
the controller is further configured to compare identification information included in the received external information with the external source identifiers to determine a manner in which to process the received external information based on the comparison.

15. The on-board vehicle communication system according to claim 14, wherein
the controller is further configured, upon determining that the identification information corresponds to one of the external source identifiers, to compare the identification information included in the received external information with the respective priority level associated with the one of the external source identifiers to determine the manner in which to process the received external information based on the comparison of the identification information with the respective priority level.

16. The on-board vehicle communication system according to claim 1, wherein
the controller is further configured to assess a validity of the received external information based on information included in the received external information, and to control the communication device to provide an invalidity indicator for receipt by an external destination upon determining that the received external information is potentially invalid.

17. An on-board vehicle communication method comprising:
storing a plurality of security certificates in an on-board storage device of a host vehicle;
receiving at the host vehicle external information that is external of the host vehicle, the external information representing a driving environment in which the host vehicle is travelling; and
evaluating, by an on-board controller on the host vehicle, whether an amount of security certificates stored in the storage device has decreased below a first prescribed threshold;
performing, by the on-board controller, a security certificate replenishment process upon the on-board controller determining that the amount of security certificates has decreased below the first prescribed threshold, the on-board controller performing the security certificate replenishment process while permitting a communication device to use a backup security certificate, which is different from any other of the security certificates, to communicate with a remote device that is external to the host vehicle, the security certificate replenishment process including evaluating, by the on-board controller, the information representing the driving environment to assess a risk factor pertaining to the travelling of the host vehicle in the driving environment, comparing, by the on-board controller, the risk factor to a risk threshold, controlling the communication device to attempt to receive additional security certificates from at least one source that is external of the host vehicle upon the on-board controller determining that the risk factor is below the risk threshold, and controlling the communication device to refrain from attempting to receive the additional security certificates from the at least one source upon the on-board controller determining that the risk factor is at least equal to the risk threshold.

18. The on-board vehicle communication system according to claim 1, wherein
the controller evaluates the external information to determine a number of other vehicles from which the host vehicle is receiving information that is part of the external information, and determines the risk factor based on the number of other vehicles.

19. The on-board vehicle communication method according to claim 17, wherein
the evaluating includes determining a number of other vehicles from which the host vehicle is receiving information that is part of the external information, to assess the risk factor based on the number of other vehicles.

20. The An on-board vehicle communication method according to claim 17, wherein
the risk factor is set at a first risk factor level upon determining that the external information representing the driving environment indicates a first probability of the host vehicle contacting a remote object, and the risk factor is set at a second risk factor level, which is lower than the first risk factor level, upon determining that the external information representing the driving environment indicates a second probability of the host vehicle contacting a remote object, the second probability being lower than the first probability.

* * * * *